United States Patent [19]

Kuo et al.

[11] Patent Number: 5,670,991

[45] Date of Patent: Sep. 23, 1997

[54] KEYBOARD WITH A UNIVERSALLY ADJUSTING APPARATUS

[75] Inventors: Rong-Fu Kuo; Ching-Chiang Yu, both of Taipei, Taiwan

[73] Assignee: Behavior Tech Computer Corp., Taipei, Taiwan

[21] Appl. No.: 517,675

[22] Filed: Aug. 22, 1995

[51] Int. Cl.⁶ ..................... G09G 5/00
[52] U.S. Cl. ..................... 345/168; 400/489
[58] Field of Search ............... 345/168; 400/82, 400/472, 792, 473, 489, 488, 691; 341/22, 23, 26

[56] References Cited

U.S. PATENT DOCUMENTS 5,067,834 11/1991 Szmanda et al. ............... 400/489
5,393,150 2/1995 Fort ............................ 400/489

Primary Examiner—Regina D. Liang
Attorney, Agent, or Firm—Morton J. Rosenberg; David I. Klein

[57] ABSTRACT

The present invention relates to a keyboard with a universally adjusting apparatus, the keyboard unit is engaged with a universally adjusting apparatus. The universally adjusting apparatus comprises a tray having a plurality of pins to insert into a plurality of slots formed on lower side of the keyboard unit for engagement, and a axle hole formed on lower side of the tray; a bearing block having a axle hole and a plurality of tap holes formed on lower side thereof; a jack post with a nut thereon and a bearing, upper end of the jack post inserting into the axle hole of the tray and lower end of the jack post inserting into the axle hole of the bearing block; a lower base having a plurality of tap holes on upper side thereof; and a plurality of screw studs having threads on both ends, each stud installed between bearing block and lower base and engaged with bearing block and lower base.

3 Claims, 5 Drawing Sheets

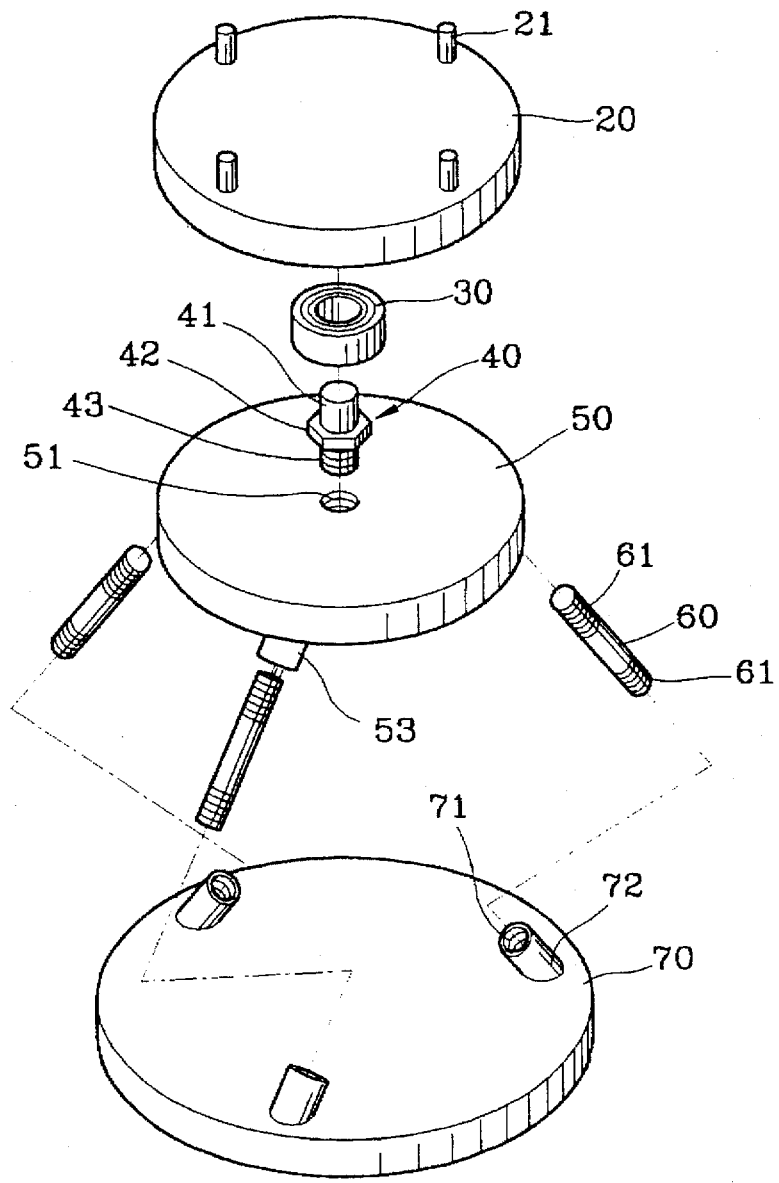
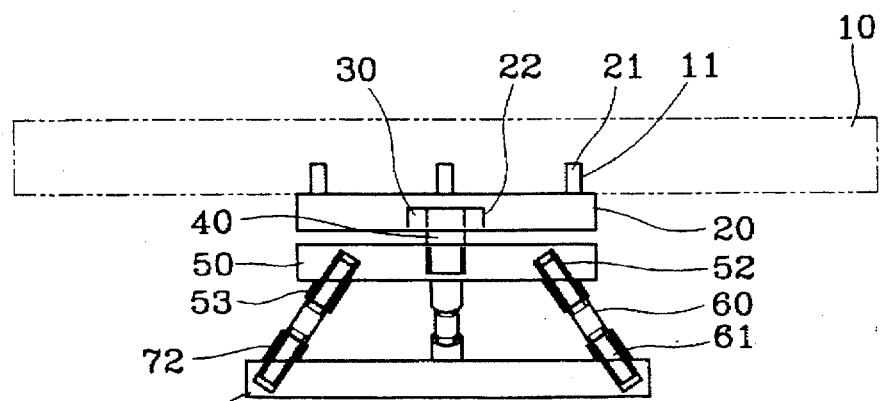

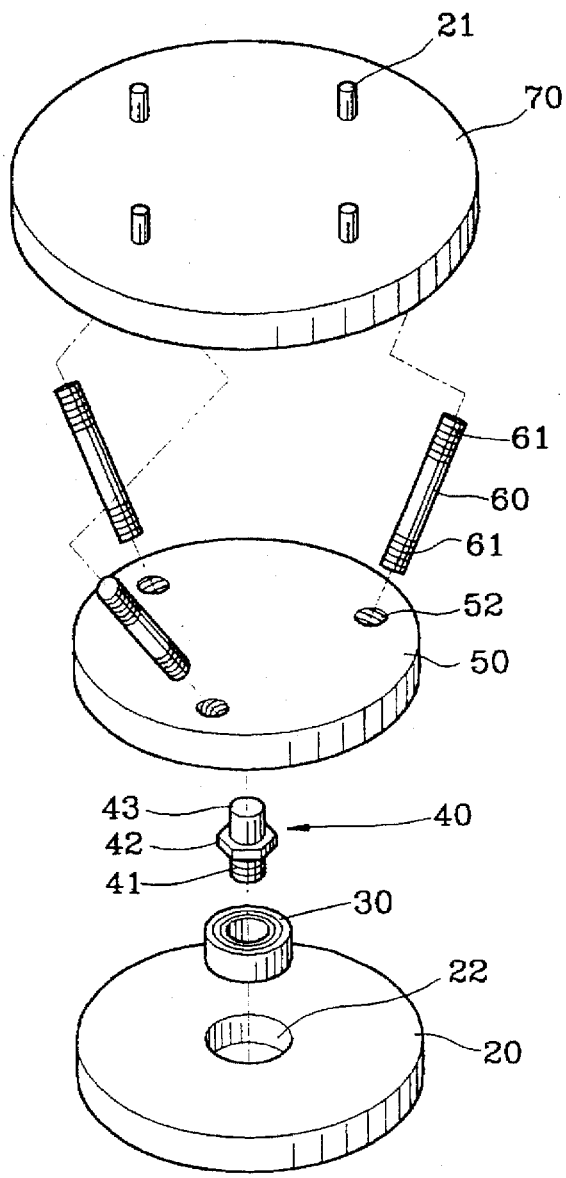
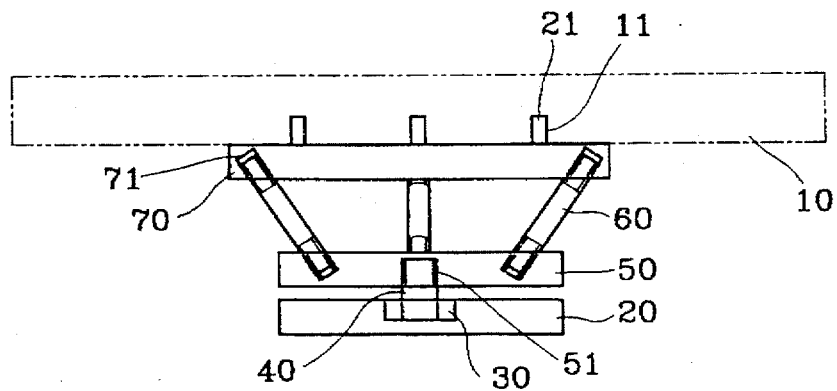

KEYBOARD WITH A UNIVERSALLY ADJUSTING APPARATUS

BACKGROUND OF THE INVENTION

1. Field of the Invention

The present invention relates to a keyboard with a universally adjusting apparatus to permit universal adjustment of the keyboard.

2. Description of Prior Art

Conventional keyboard is fixedly installed, usually, the keyboard is horizontally located or inwardly installed with a slant angle for operation. When operating, because the usage, pose, operating habit are always different for each user, for example, a taller user has a problem that the keyboard is too narrow, operation for both hands will not be convenient and fluent, his arms will not move freely, so that the keyboard does not meet the requirements of ergonomics.

Moreover, if an operator has no suitable keyboard to use and has to operate the keyboard for a long term, he will probably have a chronic disease. It is a big problem of conventional keyboard for the users.

It is required to have a keyboard which can be universally adjusting the orientation and elevation for the operation of the users.

SUMMARY OF THE INVENTION

Therefore, an objective of the present invention is to provide a keyboard with a universally adjusting apparatus, so that the orientation and elevation of the keyboard can be adjusted.

Accordingly, the keyboard of the present invention comprises two keyboard units which can be combined together and separated from each other. Each keyboard unit has an universally adjusting apparatus which comprises a tray having a plurality of pins to insert into a plurality of slots formed on lower side of the keyboard unit for engagement, and a axle hole formed on lower side of the tray; a bearing block having a axle hole and a plurality of tap holes formed on lower side thereof; a jack post with a nut thereon and a bearing, upper end of the jack post inserting into the axle hole of the tray and lower end of the jack post inserting into the axle hole of the bearing block; a lower base having a plurality of tap holes on upper side thereof; and a plurality of screw studs having threads on both ends, each stud installed between the bearing block and lower base and engaged with the bearing block and lower base.

BRIEF DESCRIPTION OF THE DRAWINGS

FIG. 3 is an exploded view of second embodiment of a universally adjusting apparatus according to the present invention;

FIG. 4 is a cross-sectional view of the universally adjusting apparatus shown in FIG. 3;

FIG. 7 is an exploded view of fourth embodiment of a universally adjusting apparatus according to the present invention;

FIG. 8 is a cross-sectional view of the universally adjusting apparatus shown in FIG. 7;

DETAILED DESCRIPTION OF THE PREFERRED EMBODIMENT

A keyboard according to the present invention may comprise a pair of keyboard unit 10. Each keyboard unit 10 can be separated from each other and can be combined together by conventional fastener means (not shown). Each keyboard unit 10 has a cable connecting to the computer (not shown). In the FIGS. 1–10, the keyboard unit is shown as dot line.

Figure 1:
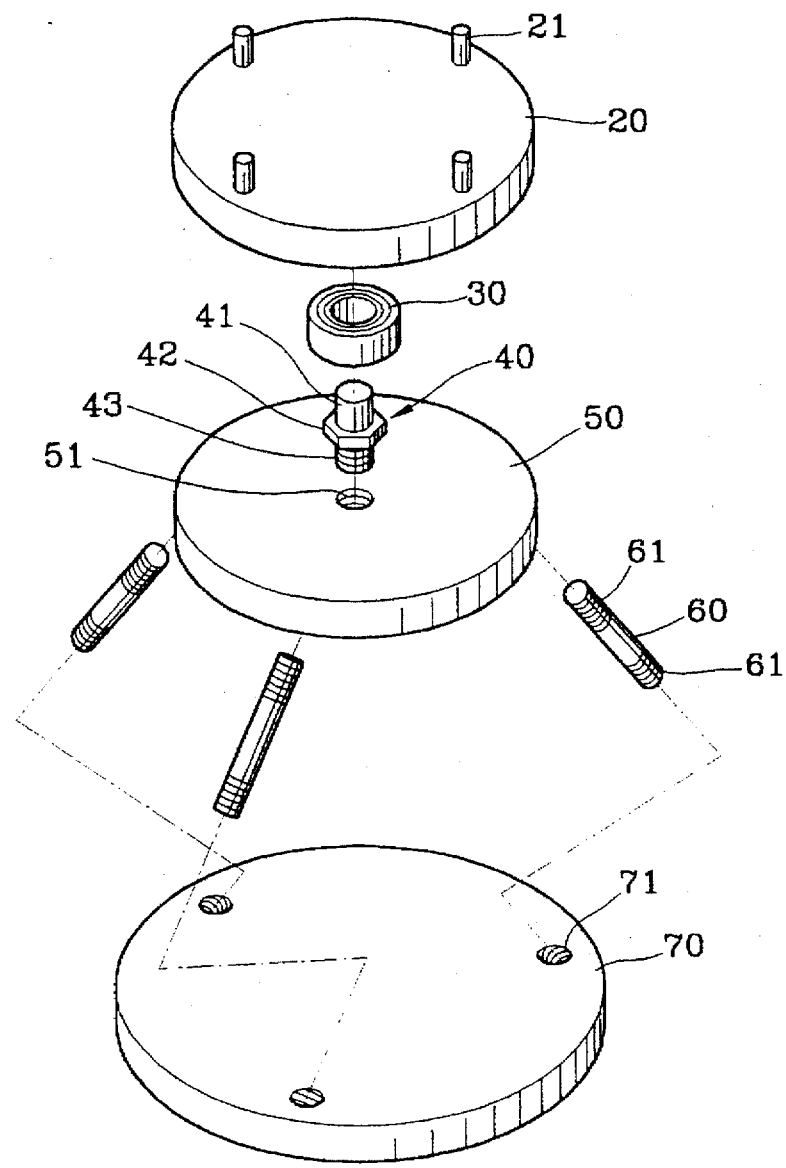
FIG. 1 is an exploded view of first embodiment of a universally adjusting apparatus according to the present invention.
Figure 2:
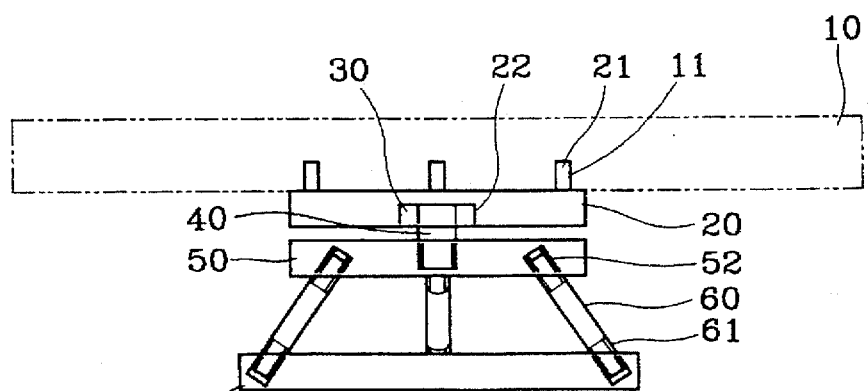
FIG. 2 is a cross-sectional view of the universally adjusting apparatus shown in FIG. 1.

Referring to FIGS. 1 & 2, the keyboard unit 10 is engaged with a universally adjusting apparatus. The universally adjusting apparatus comprises a tray 20 having a plurality of pins 21 to insert into a plurality of slots 11 formed on lower side of the keyboard unit 10 for engagement, and a axle hole formed on lower side of the tray 20; a bearing block 50 having a axle hole 51 and a plurality of tap holes 52 formed on lower side thereof; a jack post 40 with a nut thereon and a bearing 30, upper end of the jack post 40 inserting into the axle hole 22 of the tray 20 and lower end of the jack post 40 inserting into the axle hole 51 of the bearing block 50; a lower base 70 having a plurality of tap holes 71 on upper side thereof; and a plurality of screw studs 60 having threads 61 on both ends, each stud 60 installed between bearing block 50 and lower base 70 and engaged with bearing block 50 and lower base 70.

Since there is a bearing 30 mounted between the tray 20 and the bearing block 50, the tray 20 can freely rotate relative to the bearing block 50. The screw studs 60, at least three, can be rotated to adjust the distance between the bearing block 50 and the lower base 70. Therefore, when assembled, the keyboard unit 10 is mounted on the tray 20, the keyboard unit 10 can be universally adjusted, that is, the orientation and elevation of the keyboard unit 10 can be adjusted.

There are many modification within the spirit and scope of the invention. Referring to FIGS. 3 & 4, each of the beating block 50 and lower base 70 may have a plurality of tubes 53, 72 extending to each other order to engage with the screw stud 60.

Figure 5:
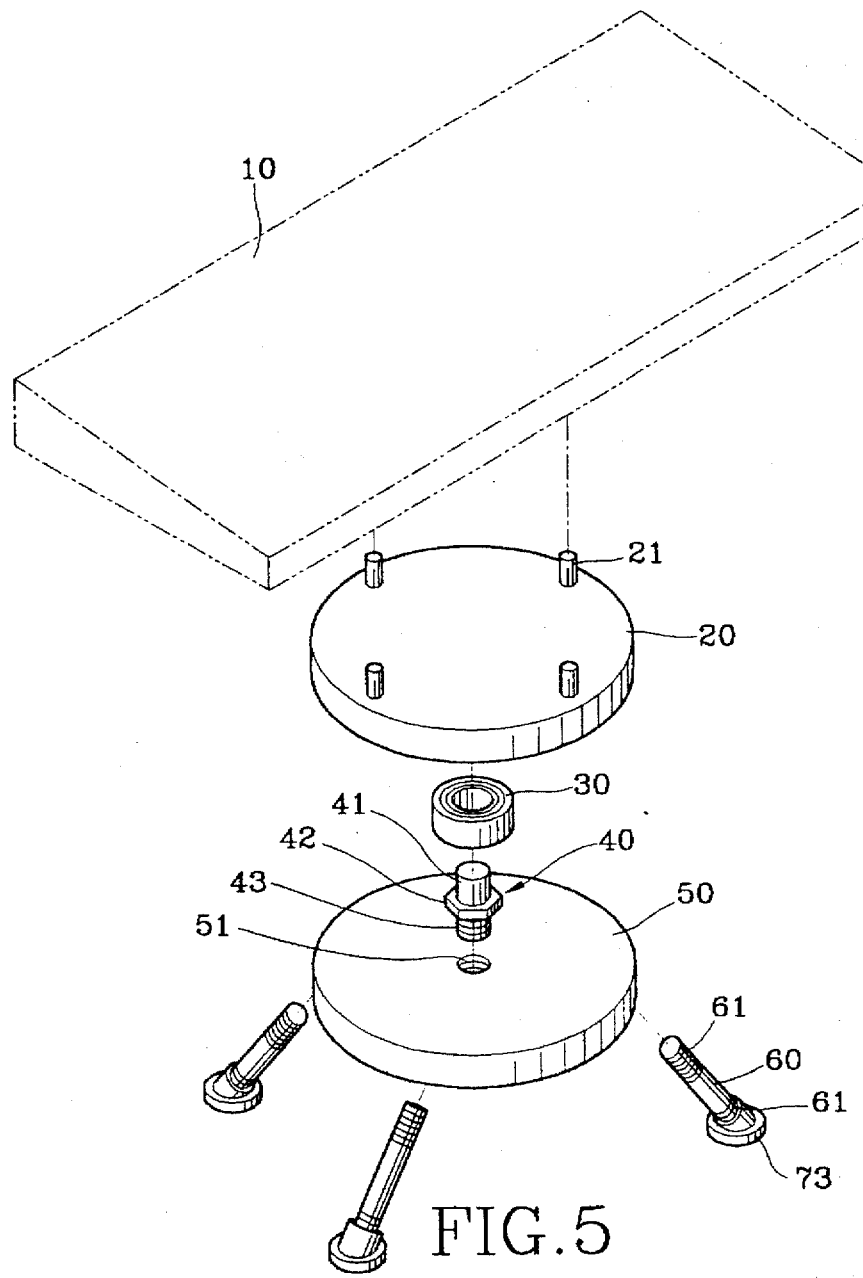
FIG. 5 is an exploded view of third embodiment of a universally adjusting apparatus according to the present invention.
Figure 6:
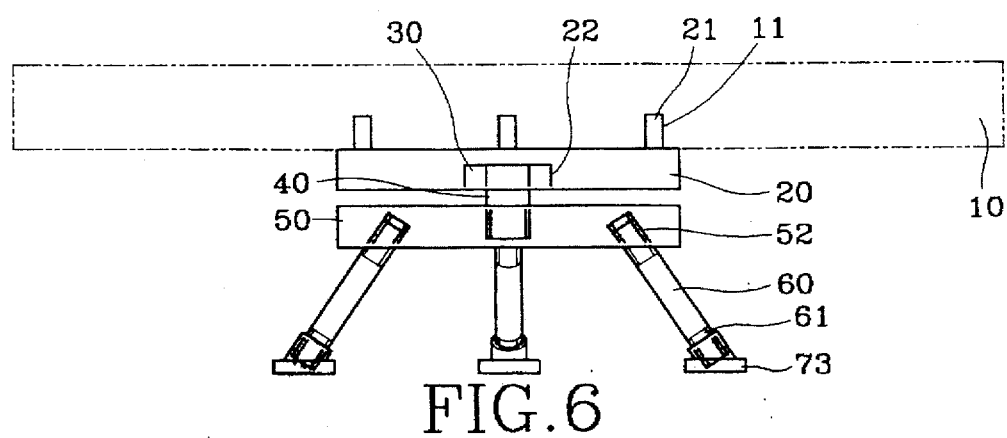
FIG. 6 is a cross-sectional view of the universally adjusting apparatus shown in FIG. 5.

As shown in FIGS. 5 & 6, the lower base 70 may be replaced with a plurality of foot pieces 73 to engage with respective screw studs 60.

FIGS. 7 & 8 shows a further embodiment of the invention. It is seen that the position of the lower base 70 and the tray 20 changes, and the pins 21 is provided on the upper surface of the lower base 70 to engage with keyboard unit 10.

Figure 9:
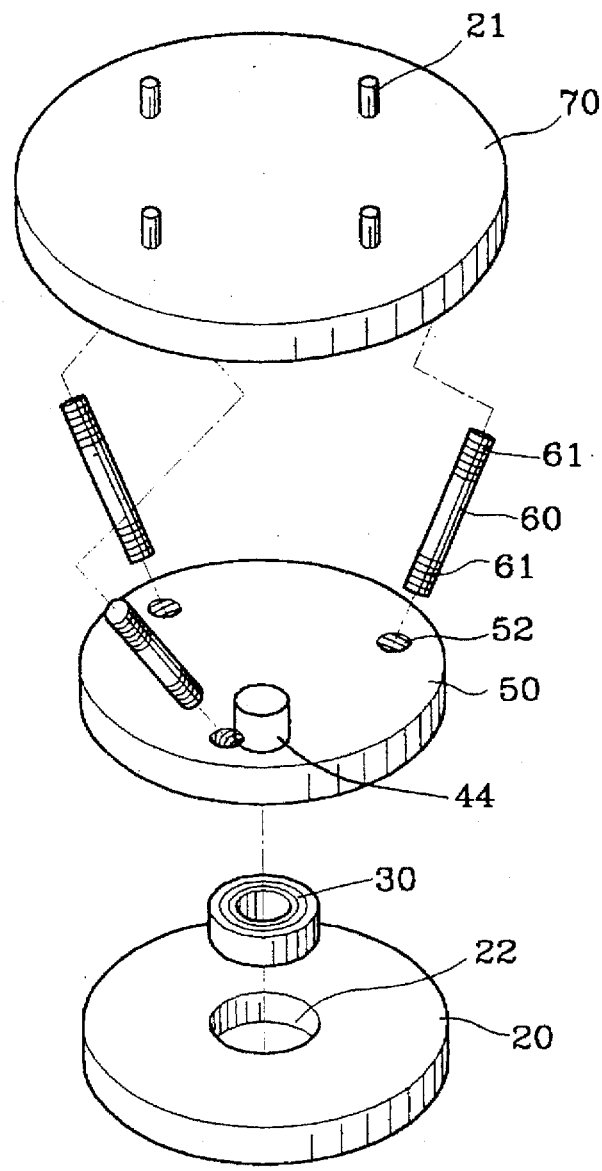
FIG. 9 is an exploded view of fifth embodiment of a universally adjusting apparatus according to the present invention.
Figure 10:
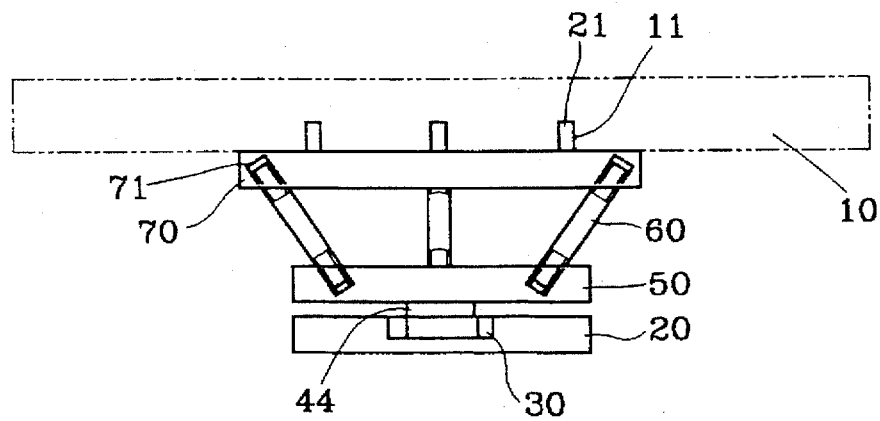
FIG. 10 is a cross-sectional view of the universally adjusting apparatus shown in FIG. 9.

The further embodiment shown in FIGS. 9 & 10 comprises a axle 44 inserting into the bearing 30 and the hole 22, the position of the tray 20 and the lower base 70 also changes.

However, all of the above mentioned embodiments have the advantages and features of the present invention. It is believed that other modification, variations will be suggested to those skilled in the art from the teaching set forth herein and should be fall within the scope of the present invention as defined by the append claims.

What is claimed is:

1. A keyboard comprising a pair of keyboard units each of which has a universally adjusting apparatus engaged therewith, the universally adjusting apparatus comprising:
   a tray having a plurality of pins to insert into a plurality of slots formed on a lower side of the keyboard unit for engagement therewith, and an axle hole formed on a lower side of the tray;
   a bearing block having an axle hole and a plurality of tap holes formed on a lower side thereof;
   a jack post with a nut thereon and a bearing, an upper end of the jack post being inserted into the axle hole of the tray and a lower end of the jack post being inserted into the axle hole of the bearing block;
   a lower base having a plurality of tap holes formed in an upper side thereof; and
   a plurality of screw studs having threads on opposing ends thereof, each stud being installed between the bearing block and the lower base and engaged with the bearing block and the lower base.

2. The keyboard as claimed in claim 1, wherein both the bearing block and the lower base have a plurality of tubes extending toward each other for engagement with respective screw studs.

3. The keyboard as claimed in claim 1, wherein the number of screw studs is three.

* * * * *